(12) United States Patent
Mao et al.

(10) Patent No.: US 9,729,105 B2
(45) Date of Patent: Aug. 8, 2017

(54) DISTRIBUTED SOLAR POWER GENERATION AND HOT WATER SUPPLYING SYSTEM

(71) Applicant: JIANGSU ZHENFA INVESTMENT & DEVELOPMENT CO., LTD, Jiangsu (CN)

(72) Inventors: Jiansheng Mao, Jiangsu (CN); Zhengfa Zha, Jiangsu (CN)

(73) Assignee: Jiangsu Zhenfa Holding Group Co., Ltd., Wuxi, Jiangsu (CN)

( * ) Notice: Subject to any disclaimer, the term of this patent is extended or adjusted under 35 U.S.C. 154(b) by 217 days.

(21) Appl. No.: 14/758,201

(22) PCT Filed: Apr. 9, 2013

(86) PCT No.: PCT/CN2013/073946
§ 371 (c)(1),
(2) Date: Jun. 26, 2015

(87) PCT Pub. No.: WO2014/101360
PCT Pub. Date: Jul. 3, 2014

(65) Prior Publication Data
US 2015/0357970 A1    Dec. 10, 2015

(30) Foreign Application Priority Data
Dec. 26, 2012   (CN) .......................... 2012 1 0572810

(51) Int. Cl.
*H01L 31/044*   (2014.01)
*H02S 40/44*    (2014.01)
(Continued)

(52) U.S. Cl.
CPC .......... *H02S 40/44* (2014.12); *F24D 17/0063* (2013.01); *F24D 19/1057* (2013.01);
(Continued)

(58) Field of Classification Search
CPC ....... H01L 31/00–31/078; Y02E 10/50–10/60; H02S 20/00–20/32;
(Continued)

(56) References Cited

U.S. PATENT DOCUMENTS

2005/0133082 A1*  6/2005  Konold ............... H01L 31/0543
                                                    136/246
2009/0065045 A1*  3/2009  Tsadka ...................... F24J 2/12
                                                    136/246

* cited by examiner

*Primary Examiner* — Bach Dinh (57) ABSTRACT

A distributed solar power generation and hot water supplying system includes: a photovoltaic power generation self-service sun tracking system, an inverter, a controller, a storage battery, a heat-exchanging water tank and an electric heater provided therein, wherein a solar battery and a solar collector are mounted on the photovoltaic power generation self-service sun tracking system, an electricity output terminal of the photovoltaic power generation self-service sun tracking system is respectively connected to an inversing input terminal of an inverter and a surplus power supplying input terminal of a controller; an MCU-controlled power output terminal of the inverter is respectively connected for off-grid power consumption or grid-connected power generation, and to an inversing output terminal of the controller; a charging/discharging control output/input terminal inside the inverter is connected to an input/output terminal of the storage battery and a storage battery power supplying input terminal of the controller.

15 Claims, 5 Drawing Sheets

(51) Int. Cl.
*F24D 17/00* (2006.01)
*H02J 7/35* (2006.01)
*H02S 20/32* (2014.01)
*F24D 19/10* (2006.01)
*F24J 2/05* (2006.01)
*F24J 2/24* (2006.01)
*F24D 3/10* (2006.01)
*H02J 3/38* (2006.01)

(52) U.S. Cl.
CPC ............... *H02J 7/35* (2013.01); *H02S 20/32* (2014.12); *F24D 3/1008* (2013.01); *F24D 2200/02* (2013.01); *F24D 2200/08* (2013.01); *F24D 2200/14* (2013.01); *F24H 2240/09* (2013.01); *F24J 2/055* (2013.01); *F24J 2/24* (2013.01); *H02J 3/383* (2013.01); *Y02B 10/20* (2013.01); *Y02B 10/70* (2013.01); *Y02E 10/563* (2013.01); *Y02E 10/566* (2013.01); *Y02E 10/60* (2013.01)

(58) Field of Classification Search
CPC ......... H02S 10/00–10/40; H02S 30/00–30/20; H02S 40/00–40/44; H02S 50/00–50/15; H02S 99/00; F24J 2/54–2/5431; F24J 2002/5434–2002/5496
USPC ........................... 136/243–265; 126/569–713
See application file for complete search history.

DISTRIBUTED SOLAR POWER GENERATION AND HOT WATER SUPPLYING SYSTEM

CROSS REFERENCE OF RELATED APPLICATION

This is a U.S. National Stage under 35 U.S.C 371 of the International Application PCT/CN2013/073946, filed Apr. 9, 2013, which claims priority under 35 U.S.C. 119(a-d) to CN 201210572810.5, filed Dec. 26, 2012.

BACKGROUND OF THE PRESENT INVENTION

Field of Invention

The present invention relates to technical fields of solar power generation and hot water supplying, and more particularly to a distributed solar power generation and hot water supplying system.

Description of Related Arts

Conventional solar power generation and heating system generally installs a semiconductor thermoelectric generator module on a conventional solar power water heater to generate electricity. Although power generation and hot water supplying are archived, power efficiency of the semiconductor thermoelectric module is relatively low. Especially, when solar radiation intensity is not very stable, temperature difference of a solar battery is small, and the semiconductor thermoelectric generator module is not able to generate electricity. Another method is using heat generated by the solar batteries to heat water in hot water pipes, which is only suitable for utilization with relatively good sunlight. If continuity of solar radiation values is not stabile, the temperature of the solar battery is not enough for heating the water in the hot water pipes. Furthermore, cost performance of the above two methods is low.

A conventional photovoltaic power generation self-service sun tracking system, invented by MAO, Jiansheng, Chinese application No. 2012100840113, filed Mar. 27, 2012, Chinese publication CN102609003A, discloses: the photovoltaic power generation self-service sun tracking system comprising a solar battery and a driving motor, wherein an output terminal of the solar batter is connected to an inverter power generation system; wherein the photovoltaic power generation self-service sun tracking system further comprises a seat reducer; wherein the solar battery is mounted on a tray, the tray is mounted on a shaft through a tray connecting plate, the shaft is connected to an output shaft of the seat reducer through an axial flange, the seat reducer in mounted on a supporter through a reducer holder, the driving motor is connected to and drives the seat reducer through a worm gear drive converter, two angle light intensity sensors are respectively provided at an east side and a west side of the solar battery in vertical, a self-service power generator is also connected to the output terminal of the solar battery, an output terminal of the self-service power generator is respectively connected to a sun tracking processor and a 1° motor driver, the self-service power generator respectively supplies the sun tracking processor, the 1° motor driver and the driving motor, the driving motor and the 1° motor driver drive are electrically connected, the angle light intensity sensors, the 1° motor driver and the sun tracking processor are logically and electrically connected. The above structure is only applicable to power generation, application thereof is single.

SUMMARY OF THE PRESENT INVENTION

Technical Problem

For solving the above problems, the present invention provides a distributed solar power generation and hot water supplying system, which not only satisfies solar power supplying requirement of the users, but also satisfies hot water supplying requirement of the users.

Technical Solution

A technical solution of the present invention is to provide a distributed solar power generation and hot water supplying system, comprising: a photovoltaic power generation self-service sun tracking system, wherein a solar battery is mounted on the photovoltaic power generation self-service sun tracking system, an electricity output terminal of the photovoltaic power generation self-service sun tracking system is respectively connected to an inversing input terminal of an inverter and a surplus power supplying input terminal of a controller; a power output control terminal controlled by an MCU (Micro Controller Unit) in the inverter is respectively connected for off-grid power consumption or grid-connected power generation, and a normal inversing input terminal of the controller; a charging/discharging control output/input terminal inside the inverter is connected to an input/output terminal of a storage battery and a storage battery power supplying input terminal of the controller; wherein the distributed solar power generation and hot water supplying system further comprises: a heat-exchanging water tank, wherein a temperature sensor, an electric heater and a heat-exchanging copper coil pipe are mounted in the heat-exchanging water tank; a water inlet and a water outlet are respectively mounted on the heat-exchanging water tank; a solar collector is mounted on the photovoltaic power generation self-service sun tracking system, a first end of the solar collector is externally connected to a first end of the heat-exchanging copper coil pipe; a second end of the heat-exchanging copper coil pipe is connected to a second end of the solar collector through a recycling pump, and is connected to an expanding tank via a triplet; wherein the expanding tank is connected between the recycling pump and the solar collector via the triplet, which not only solves a problem that a heat conductive material will expand during temperature increasing, but also holds a few additional heat conductive materials as a supplement of the heat conductive material; the temperature sensor is externally connected to the controller, the controller is respectively connected to the recycling pump, the electric heater, an electromagnetic valve on an water outlet pipe and a hot water pressure gage; the controller is also connected to the input/output terminal of the storage battery and the electricity output terminal of the photovoltaic power generation self-service sun tracking system.

Furthermore, an automatic gas valve is mounted on a top of the heat-exchanging water tank. The water outlet of the heat-exchanging water tank is connected to a hot water pump and then connected to a storage inlet of a storage water tank; an automatic gas discharger is mounted on a top of the storage water tank, a bottom of the storage water tank is externally connected a user water outlet and a hot water manometer; a temperature detector is mounted inside the storage water tank; the hot water pump and the temperature detector are respectively connected to the controller. The hot water manometer is mounted on the user water outlet of the storage water tank, the hot water manometer is connected to the controller through a hot water manometer bus; the temperature detector is mounted inside the storage water tank, which is connected to the controller through a temperature sensor bus; a heat storage pipe and the water outlet pipe are respectively connected to at least one constant-temperature expandable tank in series; the electromagnetic valve is respectively mounted on the heat storage pipe and the water outlet pipe, each electromagnetic valve is connected to the controller through an electromagnetic valve bus; a water outlet switch is mounted on a water outlet of the water outlet pipe, and is connected to the controller. The constant-temperature expandable tank comprises at least two storage water tanks in series, and is expandable according to a power scale of a power station. Furthermore, the solar collector is a solar plate collector, a pipe of the solar plate collector is a red copper pipe; wherein compared with a vacuum pipe collector, the solar plate collector has advantages such as small resistance, simple structure, smooth circulation of working fluid and good heat collecting. The solar plate collector comprises an evacuation valve, a copper pipe, a transparent toughened glass cover, a heat insulating material, and a thermal sensor; wherein the thermal sensor is connected to the input terminal of the controller, a heat conductive material is installed in the copper pipe and the heat-exchanging copper coil pipe. The transparent toughened glass cover of the solar plate collector is form by specially treated toughened glass, which has bearing capacity, anti-hail ability, resistance to thermal shock, high transmittance, and no hidden trouble of broken glass; the solar plate collector has no wearing parts, needs no maintenance, and a designed product service life thereof matches the solar battery. The solar collector is a solar vacuum tube collector, wherein the solar vacuum tube collector comprises an evacuation valve, a copper pipe, a thermal sensor, and a vacuum pipe, wherein the thermal sensor is connected to the controller through the temperature sensor bus, a heat conductive material is installed in the copper pipe and the heat-exchanging copper coil pipe. The solar vacuum tube collector is an all-glass vacuum tube collector, a heat pipe vacuum tube collector, or a U-shaped vacuum tube collector. The heat-exchanging copper coil pipe is alternatively a heat-exchanging copper coil belt.

Beneficial Effects

With the above system, when solar irradiation is normal, the solar battery of the photovoltaic power generation self-service sun tracking system generates electric power, and the solar collector generates heat. The heat generated by the solar collector is sent to the heat-exchanging copper coil pipe in the heat-exchanging water tank through the recycling pump, for heating the water in the heat-exchanging water tank. When solar radiation is weak, the controller determines that the surplus power of the solar battery is not enough for running the inverter (i.e. lower than a starting power of the inverter), and the water temperature in the heat-exchanging water tank is lower than the pre-determined temperature, the surplus power which is insufficient for running the inverter is automatically sent to the electric heater for auxiliary-heating the water in the heat-exchanging water tank with the surplus power, so as to raise the water temperature in the heat-exchanging water tank. When there is no power in the solar battery at night and the water temperature in the heat-exchanging water tank reaches the certain temperature, the controller automatically sends power of the storage battery to the electric heater of the heat-exchanging water tank for heating the water in the heat-exchanging water tank, which not only satisfies solar power supplying requirement of the users, but also satisfies hot water supplying requirement of the users.

The present invention is able to auxiliary-heat the water in the heat-exchanging water tank with the surplus power in the solar battery or the power of the storage battery when the solar radiation is weak or at night. Before 9 AM and after 3 PM (depending on strength of sunlight, and generally the power is given up by the inverter system and is wasted) when solar radiation is weak, the surplus power which is insufficient for running the inverter is sent to the electric heater for auxiliary-heating the water in the heat-exchanging water tank with the surplus power, so as to greatly improve photo-thermal efficiency of the distributed solar power generation and hot water supplying system.

According to the present invention, in addition to a heat protection function achieved by mounting an automatic gas valve on the top of the heat-exchanging water tank, a special structure of the constant-temperature expandable tank comprising at least two storage water tanks in series is provided. When a temperature is higher than a certain temperature, the hot water pump is started according to a control principle of the controller MCU for involving the constant-temperature expandable tank in system operation; when the temperature is lower than a pre-determined temperature, the hot water pump is closed according to the control principle of the controller for avoiding cold water into the constant-temperature expandable tank, which not only improves system hot water exchanging efficiency, but also solves a problem that the solar collector dissipates heat when a water temperature of a plate hot water system is higher than a certain temperature, resulting in that the water temperature is difficult to be increased, heat efficiency is lowered, and a heat conductive material is volatilizable.

The present invention is an integrated product with the solar collector and the photovoltaic power generation self-service sun tracking system, wherein physical sizes thereof match to each other, adapt to each other, and are easy to be transported as well as installed. With the help of the photovoltaic power generation self-service sun tracking system, the solar collector mounted thereon always maintained at 90° angle with the sun, so as to ensure that the solar collector is able to collect a maximum amount of solar radiation for promoting photo-thermal efficiency and cost performance

DETAILED DESCRIPTION OF THE PREFERRED EMBODIMENT

Figure 1:
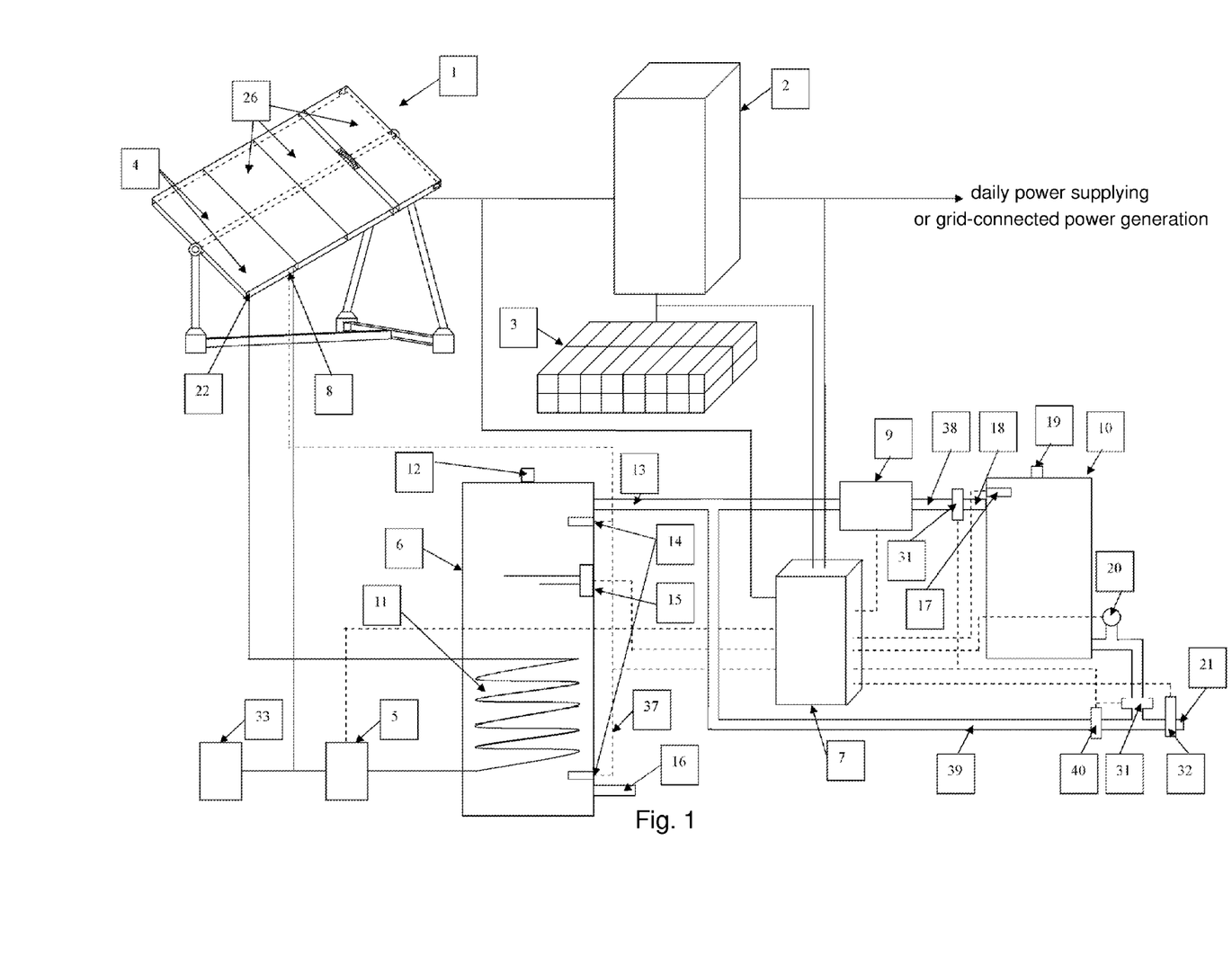
FIG. 1 is a block diagram of a distributed solar power generation and hot water supplying system.

Referring to FIG. 1, a distributed solar power generation and hot water supplying system is provided, comprising: a photovoltaic power generation self-service sun tracking system 1, wherein a solar battery 26 is mounted on the photovoltaic power generation self-service sun tracking system 1, an electricity output terminal of the photovoltaic power generation self-service sun tracking system 1 is respectively connected to an inversing input terminal of an inverter 2 and a surplus power supplying input terminal of a controller 7; a power output control terminal of the inverter 2 is respectively connected for off-grid power consumption or grid-connected power generation, and to an inversing input terminal of the controller 7; a charging/discharging control output/input terminal inside the inverter 2 is connected to an input/output terminal of a storage battery 3 and a storage battery power supplying input terminal of the controller 7; wherein the distributed solar power generation and hot water supplying system further comprises: a heat-exchanging water tank 6, wherein a temperature sensor 14, an electric heater 15 and a heat-exchanging copper coil pipe or belt 11 are mounted in the heat-exchanging water tank 6; a water inlet 16 and a water outlet 13 are respectively mounted on the heat-exchanging water tank 6; a solar collector 4 is mounted on the photovoltaic power generation self-service sun tracking system 1, a first end of the solar collector 4 is externally connected to a first end of the heat-exchanging copper coil pipe or belt 11; a second end of the heat-exchanging copper coil pipe or belt 11 is connected to a second end of the solar collector 4 through a recycling pump 5, and is connected to an expanding tank 33 via a triplet, wherein the expanding tank 33 is connected between the recycling pump 5 and the solar collector 4 via the triplet, which not only solves a problem that a heat conductive material will expand during temperature increasing, but also holds a few additional heat conductive materials as a supplement of the heat conductive material; a thermal sensor 8 and the temperature sensor 14 are externally connected to the controller 7 through a temperature sensor bus 37, the controller 7 is respectively connected to the recycling pump 5, and the electric heater 15; the storage battery power supplying input terminal of the controller 7 is connected to the input/output terminal of the storage battery 3 and the charging/discharging control output/input terminal inside the inverter 2; an automatic gas valve 12 is mounted on a top of the heat-exchanging water tank 6; the water outlet 13 of the heat-exchanging water tank 6 is connected to a hot water pump 9 and then connected to a storage inlet 18 of a constant-temperature expandable tank 10 through a heat storage pipe 38; an automatic gas discharger 19 is mounted on a top of the constant-temperature expandable tank 10, a bottom of the constant-temperature expandable tank 10 is externally connected a user water outlet 21 and a hot water manometer 20; a water outlet switch 32 is mounted on the user water outlet 21, and is connected to a water detecting terminal of the controller 7; a temperature detector 17 is mounted inside the constant-temperature expandable tank 10; the temperature detector 17 is connected to the controller 7 through the temperature sensor bus 37.

Figure 5:
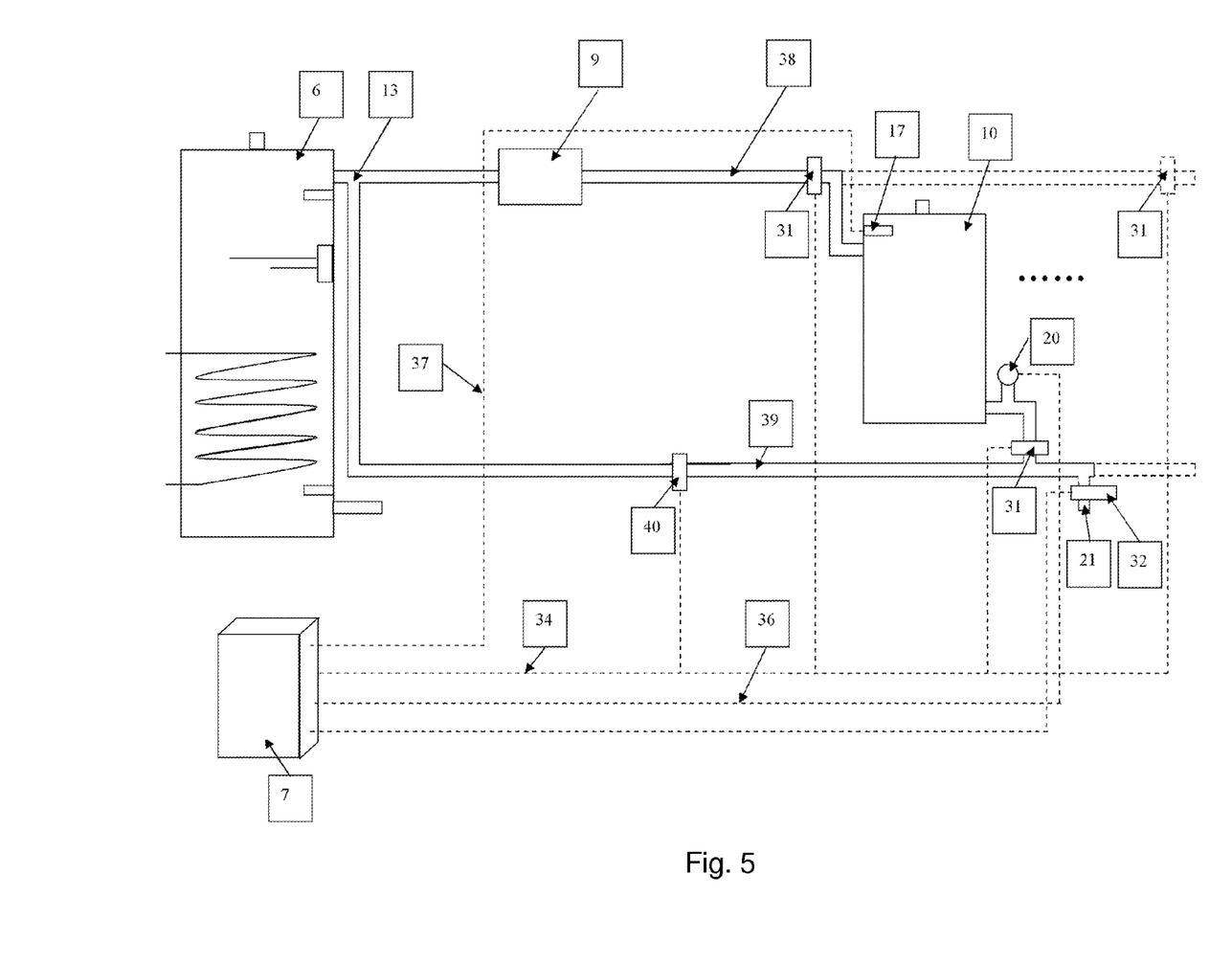
FIG. 5 is a structural view of the distributed solar power generation and hot water supplying system when storing hot water with a constant-temperature expandable tank.

Referring to FIG. 5, the temperature detector 17 and the hot water manometer 20 on the constant-temperature expandable tank 10 are respectively connected to the controller 7 through the temperature sensor bus 37 and a hot water manometer bus 36. When one or more of the constant-temperature expandable tank 10 are connected in series, the controller 7 opens a first electromagnetic valve 31 on the heat storage pipe 38 through an electromagnetic valve bus 34, and hot water passes through the heat storage pipe 38 and enters a first constant-temperature expandable tank 10. When the controller 7 determines through the hot water manometer bus 36 that an internal pressure of the first constant-temperature expandable tank 10 reaches a pre-determined value, which means the first constant-temperature expandable tank 10 is full of water, the controller 7 opens a second electromagnetic valve 31 on the heat storage pipe 38 through an electromagnetic valve bus 34, and the hot water enters a second constant-temperature expandable tank 10, and so on. The temperature detector 17 is mounted inside the constant-temperature expandable tank 10; the temperature detector 17 is connected to a temperature sensing bus terminal of the controller 7 through the temperature sensor bus 37. When the temperature of the solar plate collector is higher than a certain temperature, the hot water pump 9 is started according to a control principle of the controller 7 for involving the constant-temperature expandable tank 10 in system operation; when the temperature is lower than a pre-determined temperature, the hot water pump 9 is closed according to a MCU (Micro Controller Unit) control principle of the controller 7 for avoiding cold water into the constant-temperature expandable tank 10, which not only improves system hot water exchanging efficiency, but also solves a problem that the solar collector dissipates heat when a water temperature of a plate hot water system is higher than a certain temperature, resulting in that the water temperature is difficult to be increased, heat efficiency is lowered, and a heat conductive material is volatilizable. Furthermore, when storing heat, the controller 7 detects the water temperature in the heat-exchanging water tank through the temperature sensor bus 37, then opens the electromagnetic valve 31 corresponding to the constant-temperature expandable tank 10 through the electromagnetic valve bus 34 and starts the hot water pump 9 for sending the hot water from the heat-exchanging water tank 6 to each constant-temperature expandable tank 10 through the heat storage pipe 38. When the controller 7 determines through the hot water manometer bus 36 that the internal pressure of each constant-temperature expandable tank 10 reaches the pre-determined value, which means each constant-temperature expandable tank 10 is full of water, the controller 7 closes the hot water pump 9, the recycling pump 5 and the electric heater 15. When the controller 7 determines that the temperature is lower than the pre-determined temperature, the hot water pump 9 is closed for avoiding cold water into the constant-temperature expandable tank 10. When the controller 7 determines through the water detecting terminal that the water outlet switch 32 is pushed by the user, the controller 7 detects the hot water monometer 20 on each constant-temperature expandable tank 10 in sequence through the hot water monometer bus 36. When the internal pressure detected of the constant-temperature expandable tank 10 is higher than a pre-determined value, which means that there is hot water in the constant-temperature expandable tank 10, the controller 7 opens the electromagnetic valve 31 on a water outlet pipe 39 of the constant-temperature expandable tank 10 through the electromagnetic valve bus 34, in such a manner that the hot water in the constant-temperature expandable tank 10 is sent to the user water outlet 21 through the water outlet pipe 39 for supplying the user. When the controller 7 determines through the hot water monometer bus 36 that the constant-temperature expandable tank 10 is empty, the controller 7 automatically opens a electromagnetic valve 40 for sending the water in the heat-exchanging tank 6 to the user water outlet 21, and closes the hot water pump 9 at the same time, so as to supplying hot water to the user when the constant-temperature expandable tank 10 is empty.

Figure 3:
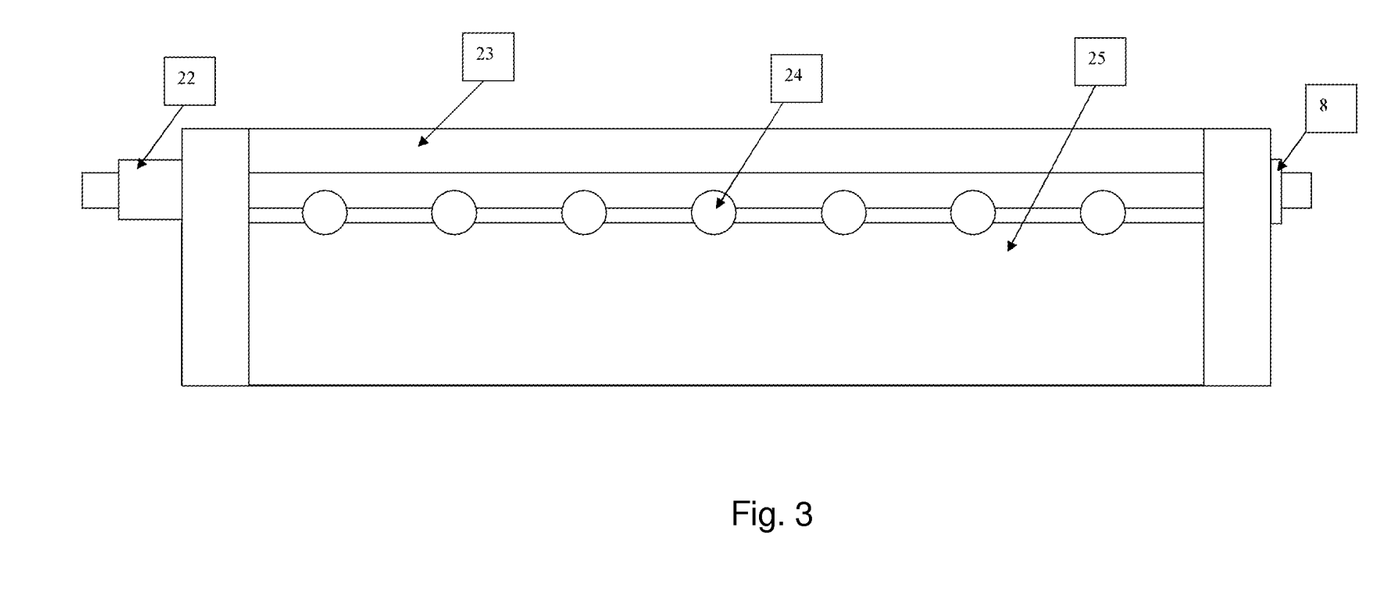
FIG. 3 is sketch view of a solar plate collector (which is a side view).
Figure 4:
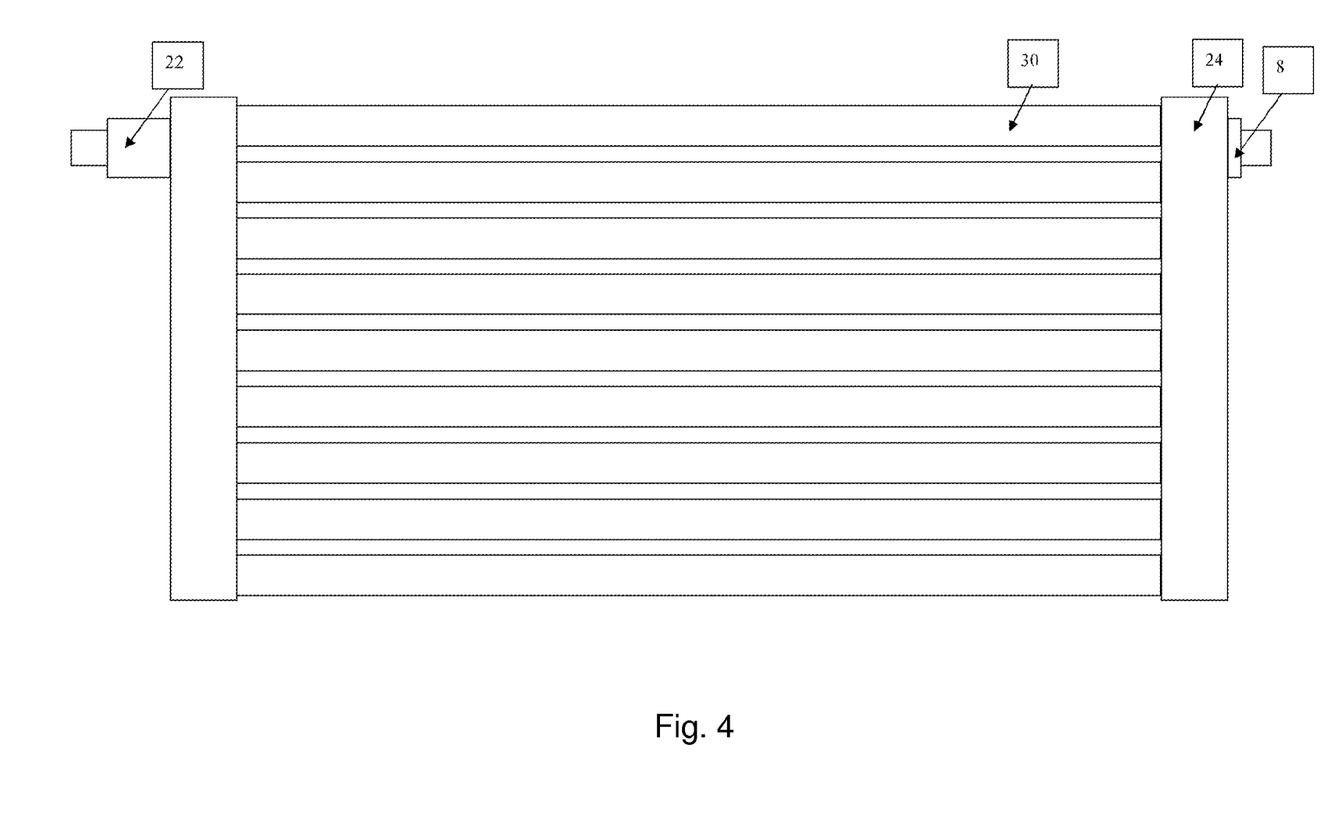
FIG. 4 is a sketch view of a solar vacuum pipe collector (which is a top view).

Referring to FIG. 3 and FIG. 4, the solar collector 4 is the solar plate collector or a solar vacuum tube collector, and the solar vacuum tube collector is an all-glass vacuum tube collector, a heat pipe vacuum tube collector, or a U-shaped vacuum tube collector.

Referring to FIG. 3, a structure of the solar plate collector is illustrated, wherein the solar plate collector comprises an evacuation valve 22, a copper pipe 24, a heat insulating material 25, a thermal sensor 8, and a transparent cover 23; wherein the thermal sensor 8 is connected to the controller 7, a heat conductive material is installed in the copper pipe 24 and the heat-exchanging copper coil pipe or belt 11.

Referring to FIG. 4, a structure of the solar vacuum pipe collector is illustrated, wherein the solar vacuum tube collector comprises an evacuation valve 22, a copper pipe 24, a thermal sensor 8, and a vacuum pipe 30, wherein the thermal sensor 8 is connected to the controller 7, a heat conductive material is installed in the copper pipe 24 and the heat-exchanging copper coil pipe or belt 11.

Figure 2:
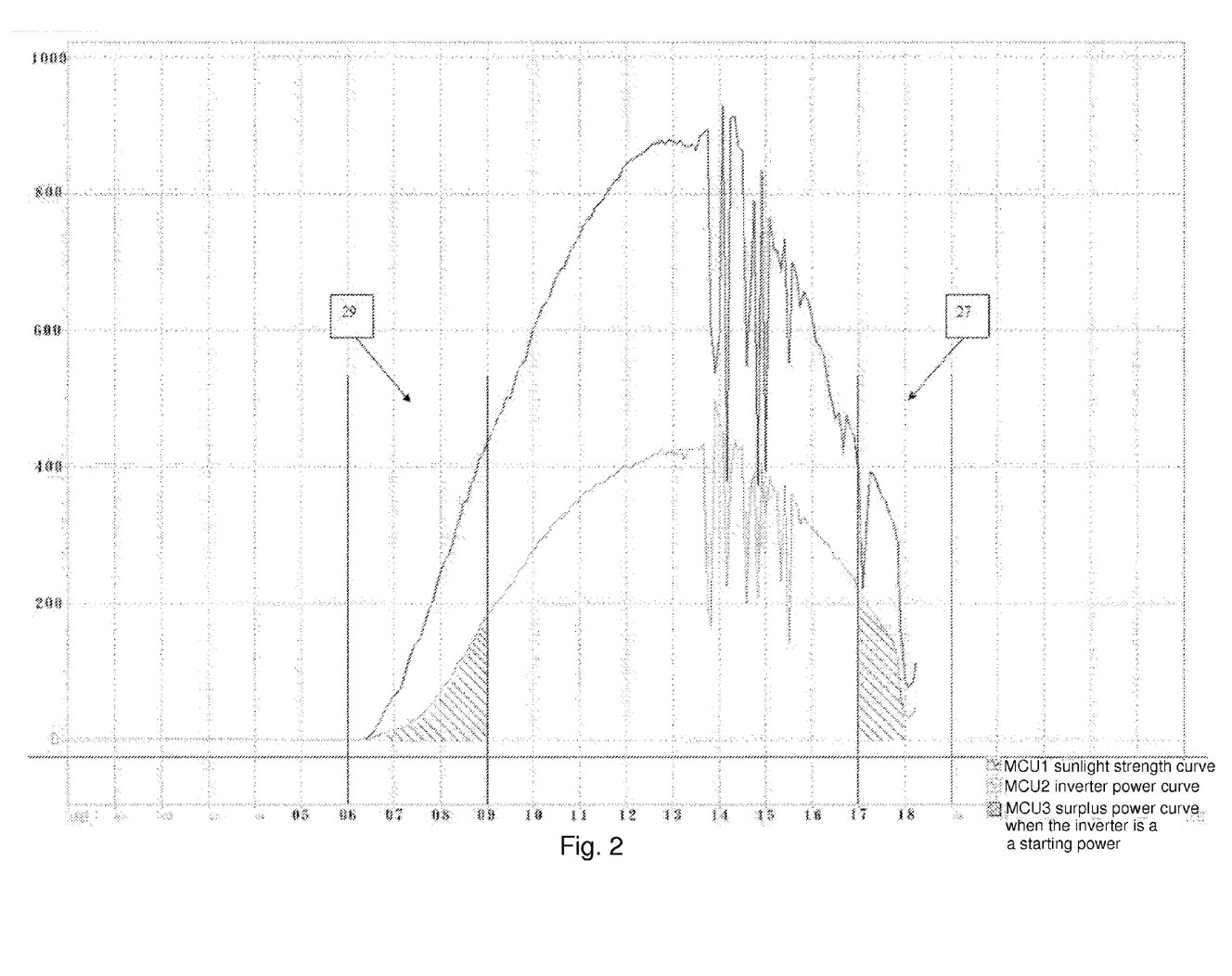
FIG. 2 is a diagram of a whole-day solar radiation tendency of somewhere in west of China and surplus power of an inverter.

Principles thereof are as follows. When the solar radiation is normal, the solar battery 26 is mounted on the photovoltaic power generation self-service sun tracking system 1, the electricity output terminal of the photovoltaic power generation self-service sun tracking system 1 is respectively connected to the inversing input terminal of the inverter 2 and the surplus power supplying input terminal of the controller 7; the power output control terminal of the inverter 2 is connected for off-grid power consumption or grid-connected power generation (referring to Chinese patent: off-grid/grid-connected solar power generation system, application No. 2012100364742, invented by MAO, Jiansheng), and is connected to a normal inversing input terminal of the controller 7. The charging/discharging control output/input terminal inside the inverter 2 and the input/output terminal of the storage battery 3 are connected to the storage battery power supplying input terminal of the controller 7. The controller 7 comprises an automatically screening circuit, for selecting the normal inversed output terminal of the inverted 2 or the storage battery 3 as a power source of the controller 7 according to the MCU control principle of the controller 7. The controller 7 detects the thermal sensor 8 on the solar collector 4 through the temperature sensor bus 37 for detecting the temperature of the solar collector 4. When the temperature detected of the solar collector 4 reaches the pre-determined temperature and the water temperature in the heat-exchanging water tank 6 is lower than the pre-determined temperature, the recycling pump 5 is started for driving the heat conductive material in the heat-exchanging copper coil pipe or belt 11 to move from a bottom to a top of the solar collector 4, so as to absorb heat of the solar collector 4 and then flow out from the top of the solar collector 4 and into the heat-exchanging copper coil pipe or belt 11 inside the heat-exchanging water tank 6, wherein when the heat conductive material flows from a bottom to a top of the heat-exchanging copper coil pipe or belt 11, the heat is transmitted to the water in the heat-exchanging water tank 6. When the water temperature in the heat-exchanging water tank 6 reaches the pre-determined temperature, the controller 7 opens the electromagnetic valve 31 on the heat storage pipe 38 by the electromagnetic valve bus 34 and starts the hot water pump 9 for sending the hot water from the heat-exchanging water tank 6 to the constant-temperature expandable tank 10. When the controller 7 determines that the water temperature is lower than the pre-determined temperature, the hot water pump 9 is closed for avoiding cold water into the constant-temperature expandable tank 10. The controller 7 detects a hot water level of the hot water monometer 20 on the constant-temperature expandable tank 10 by the hot water monometer bus 36. When a pre-determined level is reached, the hot water pump 9 and the recycling pump 5 are closed for stopping heating. Furthermore, before 9 AM and after 3 PM (depending on strength of sunlight, and generally the power is give up by the inverter system and is wasted) when solar radiation is weak, the surplus power which is insufficient for running the inverter 2 is sent to the electric heater 15 for auxiliary-heating the water in the heat-exchanging water tank 6 with the surplus power (wherein referring to FIG. 2, MCU1 curve is a sunlight strength curve, MCU2 is an inverter power curve and MCU3 is a surplus power curve when the inverter 2 is at a starting power, wherein an area 29 illustrates a sunlight condition before 9 AM, and an area 27 illustrates a sunlight condition after 5 PM). With the above structure, the surplus power which is insufficient for running the inverter 2 before 9 AM and after 3 PM when solar radiation is weak, is sent to the electric heater 15 for auxiliary-heating the water in the heat-exchanging water tank 6 with the surplus power, so as to greatly improve photo-thermal efficiency of the distributed solar power generation and hot water supplying system.

When the solar radiation is insufficient, the surplus power of the solar battery 26 is not enough for starting the inverter 2, the charging/discharging control output/input terminal inside the inverter 2 inverses the power in the storage battery 3 into an alternating current for supplying the user or grid-connected power generation. At the same time, the charging/discharging control output/input terminal inside the inverter 2 and the input/output terminal of the storage battery 3 are connected to the storage battery power supplying input terminal of the controller 7. The controller 7 comprises the automatically screening circuit, for selecting the normal inversed output terminal of the inverted 2 or the storage battery 3 as the power source of the controller 7 according to the MCU control principle of the controller 7. At the moment, a temperature detected by the thermal sensor 8 on the solar collector 4 is lower than the water temperature in the heat-exchanging water tank 6 (when the solar radiation is week or at night). When the controller 7 determines through a temperature detecting bus that the water temperature in the heat-exchanging water tank 6 is lower than the pre-determined temperature, then the controller 7 detects whether the surplus power of the solar battery 26 is sufficient. If the surplus power of the solar battery 26 is sufficient, the surplus power of the solar battery 26 on the photovoltaic power generation self-service sun tracking system 1 is sent to the electric heater 15 for heating the water in the heat-exchanging water tank 6. If the surplus power of the solar battery 26 is insufficient, the controller 7 automatically selects the power of the storage battery 3 for auxiliary-heating. When the water temperature of the heat-exchanging water tank 6 reaches the pre-determined temperature, the controller 7 opens the electromagnetic valve 31 on the heat storage pipe 38 by the electromagnetic valve bus 34 and starts the hot water pump 9 for sending the hot water from the heat-exchanging water tank 6 to the constant-temperature expandable tank 10. When the water temperature of the heat-exchanging water tank 6 is lower than the pre-determined temperature, the controller 7 closes the hot water pump 9 for avoiding cold water into the constant-temperature expandable tank 10. The controller 7 detects the hot water level of the hot water monometer 20 on the constant-temperature expandable tank 10 by the hot water monometer bus 36. If the pre-determined level is reached, the electric heater 15, the hot water pump 9 and the recycling pump 5 are automatically closed by the controller 7 for stopping heating. According to the above program, the distributed solar power generation and hot water supplying system satisfies the hot water supplying requirement of the users.

When there is no power on the solar battery 26 at night, the solar battery 26 and the solar collector 4 on the photovoltaic power generation self-service sun tracking system 1 are not able to generate power or collect heat. the charging/discharging control output/input terminal inside the inverter 2 inverses the power in the storage battery 3 into an alternating current for supplying the user or grid-connected power generation. At the same time, the charging/discharging control output/input terminal inside the inverter 2 and the input/output terminal of the storage battery 3 are connected to the storage battery power supplying input terminal of the controller 7. The controller 7 comprises the automatically screening circuit, for selecting the normal inversed output terminal of the inverted 2 or the storage battery 3 as the power source of the controller 7 according to the MCU control principle of the controller 7. When the controller 7 determines through a temperature detecting bus that the water temperature in the heat-exchanging water tank 6 is lower than the pre-determined temperature, then the controller 7 sends the power of the storage 3 to the electric heater 15 for heating the water in the heat-exchanging water tank 6 with the electric heater 15. When the water temperature of the heat-exchanging water tank 6 reaches the pre-determined temperature, the controller 7 opens the electromagnetic valve 31 on the heat storage pipe 38 by the electromagnetic valve bus 34 and starts the hot water pump 9 for sending the hot water from the heat-exchanging water tank 6 to the constant-temperature expandable tank 10. When the water temperature of the heat-exchanging water tank 6 is lower than the pre-determined temperature, the controller 7 closes the hot water pump 9 for avoiding cold water into the constant-temperature expandable tank 10. The controller 7 detects the hot water level of the hot water monometer 20 on the constant-temperature expandable tank 10 by the hot water monometer bus 36. If the pre-determined level is reached, the electric heater 15, the hot water pump 9 and the recycling pump 5 are automatically closed by the controller 7 for stopping heating. According to the above program, the distributed solar power generation and hot water supplying system satisfies the hot water supplying requirement of the users.

Furthermore, when a plurality of the constant-temperature expandable tank 10 are connected in series, the controller 7 opens the first electromagnetic valve 31 on the heat storage pipe 38 through the electromagnetic valve bus 34, and starts the hot water pump 9 for sending the hot water in the heat-exchanging water tank 6 to the first constant-temperature expandable tank 10. When the controller 7 determines through the hot water manometer bus 36 that the internal pressure of the first constant-temperature expandable tank 10 reaches the pre-determined value, which means the first constant-temperature expandable tank 10 is full of water, the controller 7 opens the second electromagnetic valve 31 on the heat storage pipe 38 through the electromagnetic valve bus 34, and the hot water enters the second constant-temperature expandable tank 10. When the controller 7 determines through the hot water manometer bus 36 that the internal pressure of the second constant-temperature expandable tank 10 reaches the pre-determined value, then the second constant-temperature expandable tank 10 is full of water, and so on. When the controller 7 determines through the hot water manometer bus 36 that the internal pressure of each of the constant-temperature expandable tank 10 reaches the pre-determined value, then all the constant-temperature expandable tank 10 are full of water, and the electric heater 15, the hot water pump 9 and the recycling pump 5 are automatically closed by the controller 7 for stopping heating.

Principles of the solar collector 4 are as follows. Sunlight passes through the transparent cover 23 or the vacuum pipe 30 to heat the copper pipe 24, so as to heat the heat conductive material inside the copper pipe 24. When the water temperature in the heat-exchanging water tank 6 is lower than the temperature of the solar collector 4 detected by the thermal sensor 8, the controller 7 starts the recycling pump 5 for driving the heat conductive material in the copper pipe 24 to move from the bottom to the top of the solar collector 4 through the heat-exchanging copper coil pipe or belt 11, so as to absorb heat of the solar collector 4 and heat the water in the heat-exchanging water tank 6. When the water temperature in the heat-exchanging water tank 6 is higher than the temperature of the solar collector 4 detected by the thermal sensor 8 (when the solar radiation is week or at night), the controller 7 closes the recycling pump for stopping the heat conductive material in the copper piper 24. When the water temperature in the heat-exchanging water tank 6 reaches the pre-determined temperature, sunlight still passes through the transparent cover 23 or the vacuum pipe 30 to heat the copper pipe 24, so as to heat the heat conductive material inside the copper pipe 24. However, when the temperature of the solar collector 4 detected by the thermal sensor 8 reaches a certain temperature, the solar collector 4 dissipates heat, resulting in heat loss of the solar collector 4 and lowering heat collecting (or hot water transforming) efficiency.

The present invention provides a system structure of connecting at least one storage water tank in series for forming the constant-temperature expandable tank 10. When the water temperature of the heat-exchanging water tank reaches the pre-determined temperature, the controller 7 starts the hot water pump 9 for sending the hot water in the heat-exchanging water tank 6 to the constant-temperature expandable tank 10, which not only solves a problem that the solar collector 4 rapidly dissipates heat when the water temperature is too high, resulting in heat loss of the solar collector 4; but also improves the hot water transforming efficiency for increasing an amount of the hot water; and further inhibits pressure increase inside the heat-exchanging water tank 6 and a problem that the heat conductive material is volatilizable. Furthermore, during system design, as long as an amount of the heat-exchanging water tank 6 connected in series is larger than a system max hot water transforming amount, which means that hot water level detecting and monitoring of the constant-temperature expandable tank 10 in series provided by the controller 7 through the hot water monometer bus 36 shows that the hot water in the heat-exchanging water tank reaches the pre-determined water level, the controller 7 closes the recycling pump 5 for stopping the heat conductive material in the copper pipe 24, so as to maximizing the photo-thermal efficiency of the distributed solar power generation and hot water supplying system.

What is claimed is:

1. A distributed solar power generation and hot water supplying system, comprising: a photovoltaic power generation self-service sun tracking system, wherein a solar battery is mounted on the photovoltaic power generation self-service sun tracking system, an electricity output terminal of the photovoltaic power generation self-service sun tracking system is respectively connected to an inversing input terminal of an inverter and a surplus power supplying input terminal of a controller; a power output control terminal controlled by a micro controller unit in the inverter is respectively connected for off-grid power consumption or grid-connected power generation, and a normal inversed output terminal of the controller; a charging/discharging control output/input terminal inside the inverter is connected to an input/output terminal of a storage battery and a storage battery power supplying input terminal of the controller; wherein the distributed solar power generation and hot water supplying system further comprises: a heat-exchanging water tank, wherein a temperature sensor, an electric heater and a heat-exchanging copper coil pipe are mounted in the heat-exchanging water tank; a water inlet and a water outlet are respectively mounted on the heat-exchanging water tank; a solar collector is mounted on the photovoltaic power generation self-service sun tracking system, a first end of the solar collector is externally connected to a first end of the heat-exchanging copper coil pipe; a second end of the heat-exchanging copper coil pipe is connected to a second end of the solar collector through a recycling pump, and is connected to an expanding tank via a triplet; the temperature sensor is externally connected to the controller, the controller is respectively connected to the recycling pump, the electric heater, an electromagnetic valve on a water outlet pipe and a hot water pressure gage; the controller is also connected to the input/output terminal of the storage battery and the electricity output terminal of the photovoltaic power generation self-service sun tracking system.

2. The distributed solar power generation and hot water supplying system, as recited in claim 1, wherein an automatic gas valve is mounted on a top of the heat-exchanging water tank.

3. The distributed solar power generation and hot water supplying system, as recited in claim 2, wherein in cloudy days and nights, the inverter outputs power, in such a manner that the electric heater auxiliary-heats water in the heat-exchanging water tank; before 9 AM and after 3 PM when solar radiation is weak, surplus power which is insufficient for running the inverter is sent to the electric heater for auxiliary-heating the water in the heat-exchanging water tank with the surplus power, so as to greatly improve photo-thermal efficiency of the distributed solar power generation and hot water supplying system.

4. The distributed solar power generation and hot water supplying system, as recited in claim 2, wherein the water outlet of the heat-exchanging water tank is connected to a hot water pump and then connected to a storage inlet of a storage water tank; an automatic gas discharger is mounted on a top of the storage water tank, a bottom of the storage water tank is externally connected a user water outlet and a hot water manometer; a temperature detector is mounted inside the storage water tank; the hot water pump and the temperature detector are respectively connected to the controller.

5. The distributed solar power generation and hot water supplying system, as recited in claim 4, wherein the hot water manometer is mounted on the user water outlet of the storage water tank, the hot water manometer is connected to the controller through a hot water manometer bus; the temperature detector is mounted inside the storage water tank, which is connected to the controller through a temperature sensor bus; a heat storage pipe and the water outlet pipe are respectively connected to at least one constant-temperature expandable tank in series; the electromagnetic valve is respectively mounted on the heat storage pipe and the water outlet pipe, each electromagnetic valve is connected to the controller through an electromagnetic valve bus; a water outlet switch is mounted on a water outlet of the water outlet pipe, and is connected to the controller.

6. The distributed solar power generation and hot water supplying system, as recited in claim 4, wherein the storage water tank is the constant-temperature expandable tank comprising at least two storage water tanks in series, and is expandable according to a power scale of a power station; when a temperature is higher than a certain temperature, the hot water pump is started according to a control principle of the controller for involving the constant-temperature expandable tank in system operation; when the temperature is lower than a pre-determined temperature, the hot water pump is closed according to the control principle of the controller for avoiding cold water into the constant-temperature expandable tank, which not only improves system hot water exchanging efficiency, but also solves a problem that the solar collector dissipates heat when a water temperature of a plate hot water system is higher than a certain temperature, resulting in that the water temperature is difficult to be increased, heat efficiency is lowered, and a heat conductive material is volatilizable.

7. The distributed solar power generation and hot water supplying system, as recited in claim 5, wherein the storage water tank is the constant-temperature expandable tank comprising at least two storage water tanks in series, and is expandable according to a power scale of a power station; when a temperature is higher than a certain temperature, the hot water pump is started according to a control principle of the controller for involving the constant-temperature expandable tank in system operation; when the temperature is lower than a pre-determined temperature, the hot water pump is closed according to the control principle of the controller for avoiding cold water into the constant-temperature expandable tank, which not only improves system hot water exchanging efficiency, but also solves a problem that the solar collector dissipates heat when a water temperature of a plate hot water system is higher than a certain temperature, resulting in that the water temperature is difficult to be increased, heat efficiency is lowered, and a heat conductive material is volatilizable.

8. The distributed solar power generation and hot water supplying system, as recited in claim 1, wherein the solar collector is a solar plate collector, a pipe of the solar plate collector is a red copper pipe.

9. The distributed solar power generation and hot water supplying system, as recited in claim 8, wherein the solar plate collector comprises an evacuation valve, a copper pipe, a transparent cover, a heat insulating material, and a thermal sensor; wherein the thermal sensor is connected to the controller through a temperature sensor bus, a heat conductive material is installed in the copper pipe and the heat-exchanging copper coil pipe.

10. The distributed solar power generation and hot water supplying system, as recited in claim 1, wherein the solar collector is a solar vacuum tube collector, and the solar vacuum tube collector is an all-glass vacuum tube collector, a heat pipe vacuum tube collector, or a U-shaped vacuum tube collector.

11. The distributed solar power generation and hot water supplying system, as recited in claim 10, wherein the solar vacuum tube collector comprises an evacuation valve, a copper pipe, a thermal sensor, and a vacuum pipe, wherein the thermal sensor is connected to the controller through a temperature sensor bus, a heat conductive material is installed in the copper pipe and the heat-exchanging copper coil pipe.

12. The distributed solar power generation and hot water supplying system, as recited in claim 1, wherein the heat-exchanging copper coil pipe is alternatively a heat-exchanging copper coil belt.

13. The distributed solar power generation and hot water supplying system, as recited in claim 4, wherein the heat-exchanging copper coil pipe is alternatively a heat-exchanging copper coil belt.

14. The distributed solar power generation and hot water supplying system, as recited in claim 9, wherein the heat-exchanging copper coil pipe is alternatively a heat-exchanging copper coil belt.

15. The distributed solar power generation and hot water supplying system, as recited in claim 11, wherein the heat-exchanging copper coil pipe is alternatively a heat-exchanging copper coil belt.

\* \* \* \* \*